Feb. 16, 1965
B. CONES
3,169,454
AIR MOTOR
Filed July 24, 1963
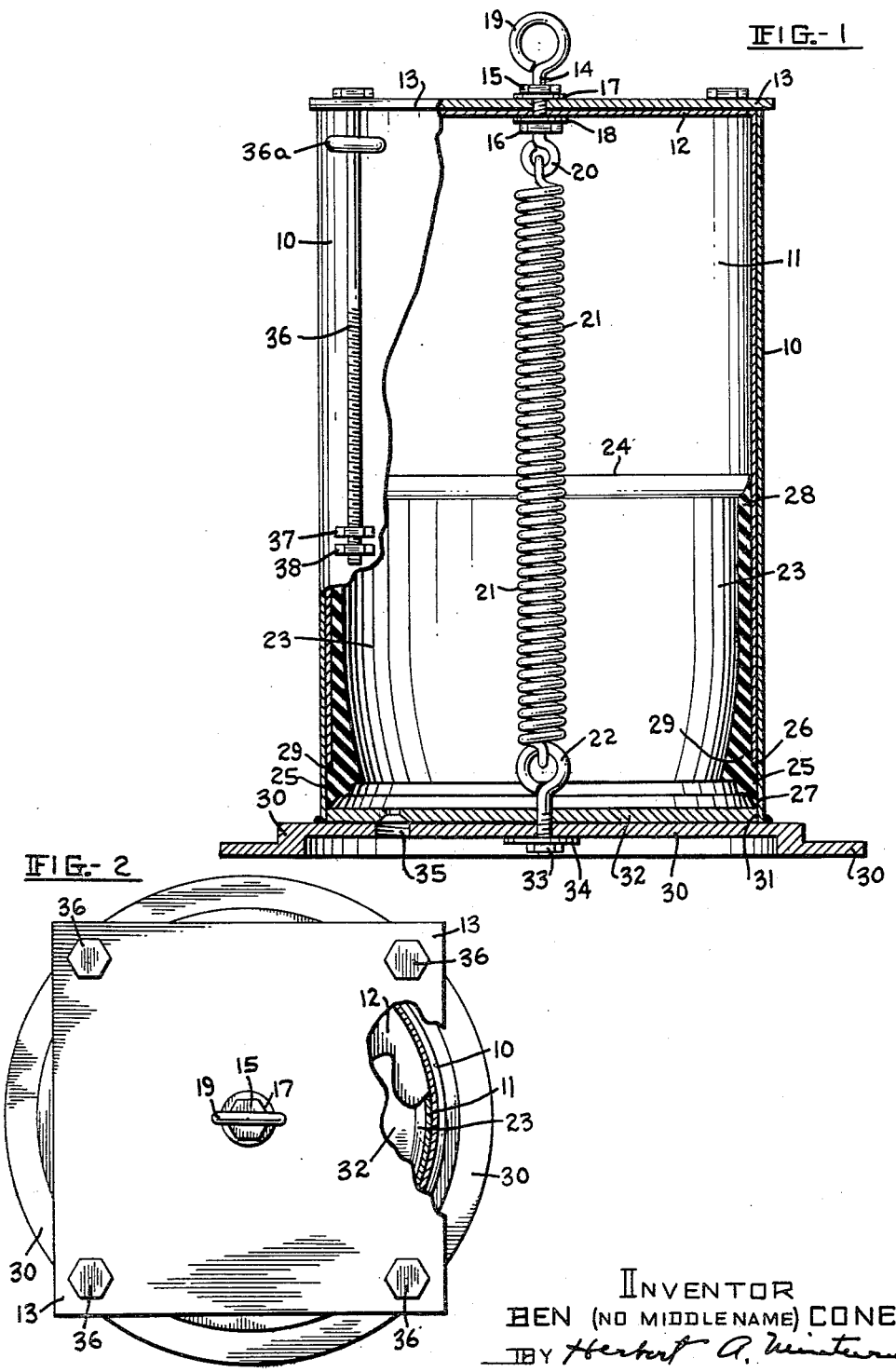
INVENTOR
BEN (NO MIDDLE NAME) CONES
BY Herbert A. Minturn
ATTORNEY

3,169,454
AIR MOTOR
Ben Cones, 6635 E. Washington St., Indianapolis, Ind.
Filed July 24, 1963, Ser. No. 297,310
2 Claims. (Cl. 92—13)

This invention relates to an air motor of the type which is employed to control and actuate operation of valves and dampers and the like in heating and ventilating systems, subject to a demand for changes in air flow and also in heating means.

Reference is made to my prior Patent Nos. 2,379,683 and 2,408,915 which relate to air motors.

Primary purposes of the present invention are to provide a structure having a minimum number of parts; a highly effective air sealing element without any spreading device; a heavy duty internal spring with means for adjusting located externally of the motor; quite low in cost of manufacture and assembly due to its simplicity; and its availability for heavy duty.

One particular form of the invention is illustrated in the accompanying drawing in which FIG. 1 is a view in partial vertical section; and FIG. 2 is a view in top plan and partial section.

An outer cylinder 10 is provided and telescoping within that cylinder 10 is an inner cylinder 11. This cylinder 11 is closed by a top header 12, and is open at its other, opposite end.

A top plate 13 is fixed across the outerside of the head 12 to extend in part at least beyond the head 12 and overlap the outer cylinder 10 when the inner cylinder 11 is at its lowermost travel therein.

A bolt 14 extends by a central portion through both the plate 13 and the head 12, and this central portion is threaded to receive nuts 15 and 16 respectively on the outerside of the plate 13 and inner side of the head 12 as a means for securing the bolt 14 to those two elements 12 and 13, being there secured in an air-tight manner by means of the washers or gaskets 17 and 18 intervening between the nuts 15 and 16 respectively and the plate 13 and the head 12. The bolt 14 has an eye 19 on one end, and an eye 20 on the end which is within the cylinder 11. One of the eyes at least is formed after the bolt 14 has been secured in position by the nuts 15 and 16. A spring 21 is secured by one end to the eye 20, and extends centrally downwardly within the cylinder 11 from that eye 20 to be secured to a lower eye bolt 22.

A flexible, elastic sleeve 23 is telescoped and positioned within the end of the inner cylinder 11 opposite the head 12, to be frictionally retained therein in respect to withdrawal from the cylinder 11. The elastic sleeve 23, by reason of its frictional engagement with the cylinder 11, moves with the cylinder 11 as the cylinder may shift axially within the cylinder 10 under variations of pressure prevailing within the cylinder 11 and the tension of the spring 21. This sleeve 23 is preferably made out of rubber or a rubber-like plastic material and is intended to serve as an air seal between the inner cylinder 11 and the outer cylinder 10. The most inward end of the sleeve 23 is tapered to a knife-like edge 24 which normally bears against the inner surface of the inner cylinder 11. This edge 24 is located slightly less than one-half of the overall length of the inner cylinder 11, although this dimension may vary. The important feature in this respect is that there be a sufficient length of the sealing sleeve 23 to afford an air seal between it and the wall of the cylinder 11. Normally the seal is effected adjacent the edge 24 since it is this edge which will be pushed outwardly against the wall of the cylinder 11 by internal air pressure.

The lower end of the sealing sleeve 23 is provided with an integral outwardly offset annular ring 25 which has its relatively upper edge externally of the sleeve 23 abutting against the under end 26 of the inner cylinder 11 and by the portion extending from that upper edge of the ring bearing compressively against the inside of the cylinder 10, this annular ring extending downwardly to a knife-like edge 27 which tends to be expanded against this inside face of the cylinder 10. Preferably, although not necessarily, the wall of the sealing sleeve 23 will taper from a thickness at the zone 28 at the end of the sleeve adjacent the knife edge portion 24 into increasing thickness to the lower zone 29 immediately inside of and at the upper end of the annular ring portion 25. This thicker portion of the sealing sleeve 23 at the zone 29 aids in maintaining a compressive bearing of the annular ring 25 against the cylinder 10.

The elements so far described and assembled are brought downwardly to a base 30, around the upper side of which is an annular shoulder 31 and over which the lower end of the cylinder 10 telescopes. The cylinder 10 is fixed in position around this shoulder 31 by any suitable means such as by welding or brazing. The bolt 22 prior to that telescoping over the shoulder 31 is inserted downwardly through the plate 32 around which the shoulder 31 appears and down through the base portion 30 to have a nut 33 screw-threadedly engaging on its lower end with an intervening sealing washer 34. The spring 21, being a coil spring, may be tensioned by pulling axially on it through the adjustment of the lower nut 33. In so doing, the inner cylinder 11 is held in a normal low limit position as is determined by the plate 13 striking the upper end of the cylinder 10.

The base 30 and plate 32 have a coaxial opening 35 therethrough for the admission of air from any suitable source not shown. The air entering the inside of the cylinder 11 through this opening 35 will be varied in pressure determining upon the degree of travel of the inner cylinder 11 in respect to the outer cylinder 10 as may be required for operating the damper or valve device (not shown) which would be connected to the eye 19.

As above indicated, the overhang of the plate 13 beyond the outer cylinder 10 determines the lowermost possible travel of the inner cylinder 11. To limit the upper or outward travel of the cylinder 11 in respect to the cylinder 10, a suitable stop means is provided, herein shown in this form as consisting of a bolt 36 extending downwardly through each of the four corners of the plate 13 which in its simplest form is rectangular in shape as indicated in FIG. 2. Each of these bolts 36 slidingly passes through an eye 36a fixed to the outer cylinder 10, FIG. 1. Of course it may be circular in outline, but that is not necessary. A suitable stop, preferably adjustable in nature, is carried by each one of these four bolts 36, and is herein shown as comprising a nut 37 which may be adjustedly positioned along the bolt 36 and secured in the desired position by means of a lock nut 38 which may be turned up against the stop nut 37 when suitably positioned.

Thus it is to be seen that the spring which offers the resistance to travel of the inner cylinder 11 is carried entirely within that cylinder and is not available from outside of the cylinder 11 and the cylinder 10. It is the only movable part within the two cylinders. The stop means is carried entirely outside of the cylinder 10 for ready adjustment for the limit of travel upwardly to the eye 36a which in the present form is shown fixed to the outside of the cylinder 11. Only one orifice is provided through the base 30 and the overlying plate 32 since the pressure within the inner cylinder 11 and the exposed end of the cylinder 10 upon the rise of the cylinder 11 will be pressurized in accordance with the pressure of the air entering the orifice 35. As that pressure decreases, the spring 21 will pull the inner cylinder 11 downwardly and as the pressure increases the inner cylinder 11 will rise to overcome the downward pull of the spring 21 to that degree occasioned by the air pressure.

While I have herein shown and described my invention in more or less minute detail in respect to the one particular form herein shown and described, I do not desire to be limited to that precise form beyond the limitations which may be required by the following claims.

I claim:
1. In an air motor, the combination of
   an outer, hollow cylinder;
   an inner, hollow cylinder telescoped to slide within said outer cylinder and open therein;
   a sealing closure across an end of said outer cylinder;
   a sealing closure across the end of said inner cylinder;
   the two closure ends being respectively one at each opposite end of the two cylinders;
   a flexible, elastic sleeve telescoped through the inner cylinder open end and retained frictionally against the inside of the cylinder, the sleeve terminating by one end therein at approximately one half the length of that cylinder from its said open end;
   a ring integrally extending radially from the end of said sleeve at the open end of the inner cylinder and elastically bearing against the inside of said outer cylinder as a seal between said cylinders;
   an elongated coil spring extending axially of said cylinders;
   attaching means engaging one end of said spring and carried by said outer cylinder end;
   attaching means engaging the other end of said spring and carried by said said inner cylinder end;
   said spring and its attaching means normally yieldingly maintaining said inner cylinder open end to be adjacent said outer cylinder closed end; and
   means limiting travel of said inner cylinder outwardly from the open end of said outer cylinder;
   said limiting means being exposed laterally and entirely outside of said outer cylinder.

2. The structure of claim 1, in which said limiting means comprises
   at least one rod extending along the outsides of said cylinders;
   means carrying one of the ends of said rod by said inner cylinder closed end;
   a rod guide member having an aperture therethrough and being carried to have the rod extend through the aperture; and
   a stop carried by said rod selectively abutting said guide member.

References Cited by the Examiner
UNITED STATES PATENTS

| | | | |
|---|---|---|---|
| 2,408,915 | 10/46 | Cones | 92—132 |
| 2,975,762 | 3/61 | Blatt et al. | 92—132 |
| 2,991,760 | 7/61 | Rhine | 92—13 |

RICHARD B. WILKINSON, *Primary Examiner*.